US012269253B2

(12) United States Patent
Liang

(10) Patent No.: US 12,269,253 B2
(45) Date of Patent: Apr. 8, 2025

(54) HEAT PRESS MACHINE

(71) Applicant: Yudong Liang, Shenzhen (CN)

(72) Inventor: Yudong Liang, Shenzhen (CN)

( * ) Notice: Subject to any disclaimer, the term of this patent is extended or adjusted under 35 U.S.C. 154(b) by 0 days.

(21) Appl. No.: 18/924,044

(22) Filed: Oct. 23, 2024

(65) Prior Publication Data

US 2025/0042147 A1 Feb. 6, 2025

(30) Foreign Application Priority Data

Feb. 7, 2024 (CN) ........................ 202420288031.0

(51) Int. Cl.
*B41F 16/00* (2006.01)

(52) U.S. Cl.
CPC .................................... *B41F 16/00* (2013.01)

(58) Field of Classification Search
CPC ....................................................... B41F 16/00
See application file for complete search history.

(56) References Cited

FOREIGN PATENT DOCUMENTS

EP 4286162 A1 * 12/2023 ............. B41F 16/00

OTHER PUBLICATIONS

Translation of CN112297601.*

* cited by examiner

*Primary Examiner* — Sonya M Sengupta
(74) *Attorney, Agent, or Firm* — Westbridge IP LLC

(57) ABSTRACT

A heat press machine includes a base, an extension arm and a heating plate. The base is provided with a first carrier plate and a second carrier plate, the extension arm is rotatably mounted on the base, the extension arm is provided with a lifting assembly, and the lifting assembly is connected to the heating plate and used for driving the heating plate to ascend and descend. A commodity to be pressed is fixed by disposing two carrier plates on the base, the movement of the heating plate above the two carrier plates is achieved by the rotatable extension arm, after the commodity on one of the carrier plates is pressed, the heating plate may be moved to be above the other carrier plate to press the commodity in processes of loading, unloading and laminating the commodity by an operator, thereby improving the printing efficiency.

8 Claims, 2 Drawing Sheets

HEAT PRESS MACHINE

CROSS-REFERENCE TO RELATED APPLICATIONS

This application claims priority to Chinese Patent Application No. 202420288031.0, filed on Feb. 7, 2024, the content of which is incorporated herein by reference in its entirety.

TECHNICAL FIELD

The present application relates to the technical field of heat press equipment, and more particularly relates to a heat press machine.

BACKGROUND

Heat press is to print patterns on surfaces of various materials, and the principle thereof is that the patterns are printed on dedicated paper for press by a printer with special press ink, so as to form a film printed with the patterns, and then accurately print the patterns on the film on a commodity surface by means of high temperature and high pressure using a dedicated heat press machine.

An existing heat press machine generally includes a base, a supporting body, a heating plate and a carrier plate, wherein the carrier plate and the supporting body are respectively mounted on the base, and the carrier plate is used for fixing a commodity to be processed; the heating plate is mounted on the supporting body, the heating plate is driven by the supporting body to move above the carrier plate, and the film is printed on a surface of the commodity to be processed by the heating plate; however, in an actual production process, after the printing work for one commodity is completed by the heating plate, the heating plate needs to be moved away from a position directly above the carrier plate, after the printed commodity is unloaded from the carrier plate and an unprinted commodity is fixed on the carrier plate again by an operator, the film printed with the patterns is covered on the commodity, and in the above process, the heating plate is always in an idle state, and printing cannot be performed continuously; and as can be seen, the existing heat press machine has the problem of low printing efficiency.

SUMMARY

The technical problem to be solved by the present application is to provide a heat press machine having high printing efficiency.

In order to solve the above technical problem, the technical solution adopted by the present application is as follows: a heat press machine includes a base, an extension arm and a heating plate, wherein the base is provided with a first carrier plate and a second carrier plate, the extension arm is rotatably mounted on the base, the extension arm is provided with a lifting assembly, and the lifting assembly is connected to the heating plate and used for driving the heating plate to ascend and descend.

Further, the extension arm is provided with a rotary handle.

Further, the rotary handle is mounted at a top of the extension arm.

Further, a bottom of the first carrier plate and a bottom of the second carrier plate are each provided with a mounting frame, and the mounting frame is connected to the base.

Further, the first carrier plate and the second carrier plate are each connected to the mounting frame detachably.

Further, the bottom of the first carrier plate and the bottom of the second carrier plate are each provided with a clamping projection, a top of the mounting frame is provided with a through hole and a clamping hole communicated with the through hole, the through hole is used for the clamping projection to pass through, and when the clamping projection is positioned in the clamping hole, the clamping projection abuts against one side of the mounting frame away from the first carrier plate or the second carrier plate.

Further, the mounting frame is connected to the base detachably.

Further, a rotary motor is further mounted on the base, and the extension arm is mounted on an output shaft of the rotary motor.

The present application has the following beneficial effects: the heat press machine provided in the present application has the feature of high press efficiency, a commodity to be pressed is fixed by disposing two carrier plates on the base, the movement of the heating plate above the two carrier plates is achieved by the rotatable extension arm, and after the commodity on one of the carrier plates is pressed, the heating plate may be moved to be above the other carrier plate to press the commodity in processes of loading, unloading and laminating the commodity by an operator, thereby greatly reducing the idle time of the heating plate and improving the printing efficiency.

DETAILED DESCRIPTION OF THE EMBODIMENTS

In order to explain the technical contents, achieved objects and effects of the present application in detail, the following description is made in conjunction with embodiments and accompanying drawings.

Figure 1:
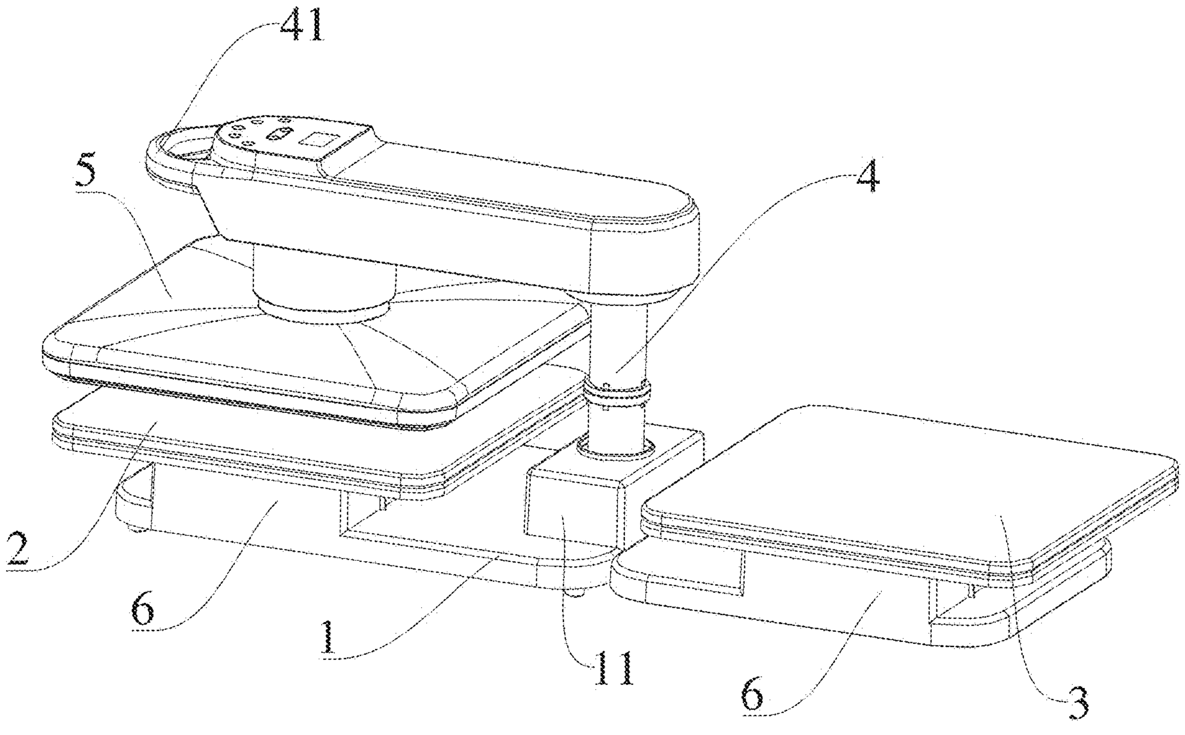
FIG. 1 is a schematic structural diagram of a heat press machine according to Example 1 of the present application.
Figure 2:
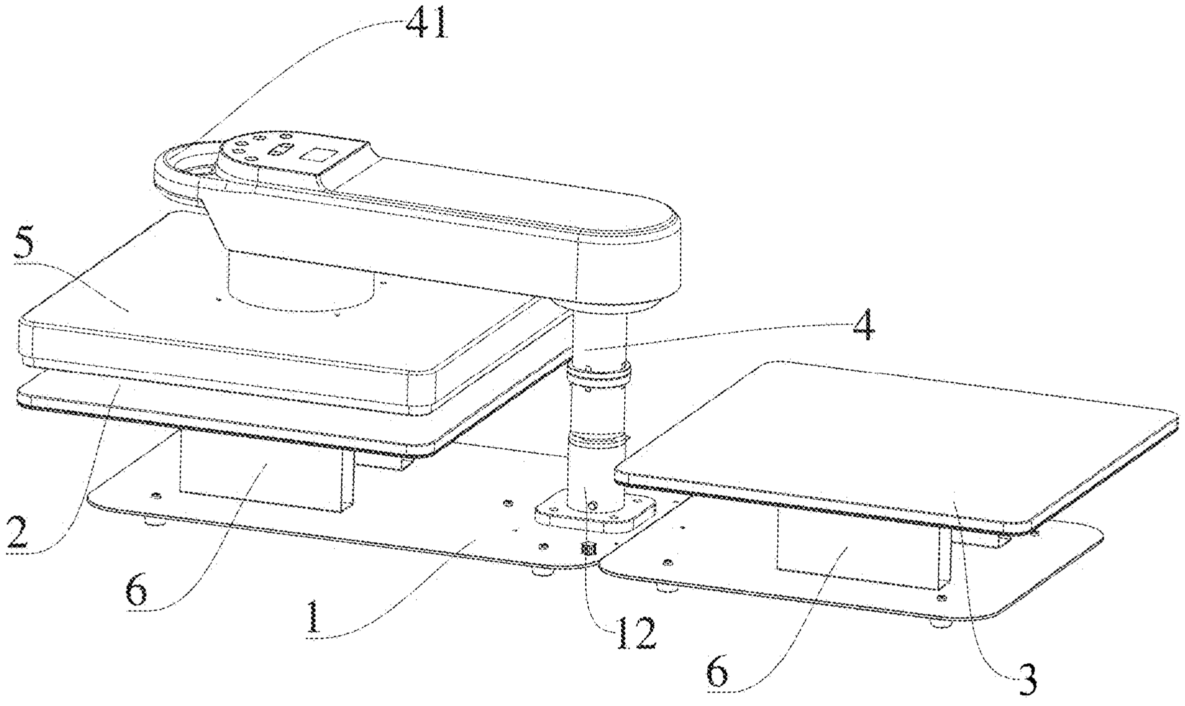
FIG. 2 is a schematic structural diagram of the heat press machine according to Example 1 of the present application (after hiding a motor housing).
Figure 3:
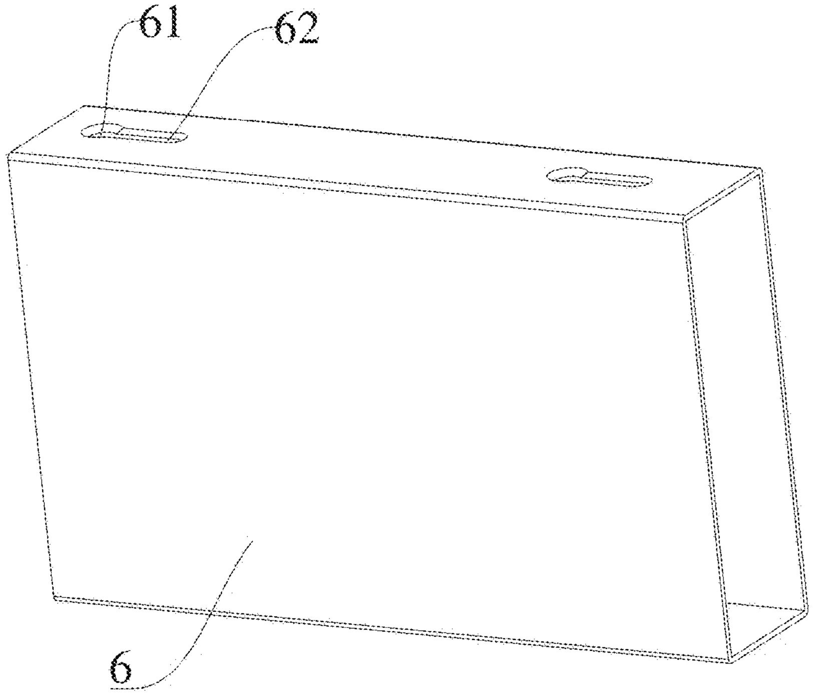
FIG. 3 is a schematic structural diagram of a mounting frame according to Example 1 of the present application.

With reference to FIG. 1 to FIG. 3, a heat press machine includes a base 1, an extension arm 4 and a heating plate 5, wherein the base 1 is provided with a first carrier plate 2 and a second carrier plate 3, the extension arm 4 is rotatably mounted on the base 1, the extension arm is provided with a lifting assembly, and the lifting assembly is connected to the heating plate 5 and used for driving the heating plate 5 to ascend and descend.

As can be seen from the above description, the present application has the following beneficial effects: a commodity to be pressed is fixed by disposing two carrier plates on the base 1, the movement of the heating plate 5 above the two carrier plates is achieved by the rotatable extension arm 4, and after the commodity on one of the carrier plates is pressed, the heating plate 5 may be moved to be above the other carrier plate to press the commodity in processes of loading, unloading and laminating the commodity by an operator, thereby greatly reducing the idle time of the heating plate and improving the printing efficiency.

Further, the extension arm 4 is provided with a rotary handle 41.

As can be seen from the above description, the rotary handle 41 facilitates the rotation of the extension arm 4 by the operator, so that the heating plate 5 is quickly moved to be directly above the corresponding carrier plate.

Further, the rotary handle 41 is mounted at a top of the extension arm 4.

As can be seen from the above description, a mounting position of the rotary handle 41 may be selected according to actual application requirements.

Further, a bottom of the first carrier plate 2 and a bottom of the second carrier plate 3 are each provided with a mounting frame 6, and the mounting frame 6 is connected to the base 1.

As can be seen from the above description, the mounting frame 6 facilitates the mounting of the first carrier plate 2 and the second carrier plate 3, thereby ensuring the stability of the first carrier plate 2 and the second carrier plate 3.

Further, the first carrier plate 2 and the second carrier plate 3 are each connected to the mounting frame 6 detachably.

As can be seen from the above description, the mounting frame 6 is disposed to be connected to the carrier plate detachably, so as to facilitate the replacement and maintenance of the carrier plate.

Further, the bottom of the first carrier plate 2 and the bottom of the second carrier plate 3 are each provided with a clamping projection, a top of the mounting frame 6 is provided with a through hole 61 and a clamping hole 62 communicated with the through hole 61, the through hole 61 is used for the clamping projection to pass through, and when the clamping projection is positioned in the clamping hole 62, the clamping projection abuts against one side of the mounting frame 6 away from the first carrier plate 2 or the second carrier plate 3.

As can be seen from the above description, the mounting and dismounting of the carrier plate can be quickly achieved by matching the clamping protrusion with the clamping hole 62, and in an actual production process, the operator may quickly unload the printed commodity together with the carrier plate, and quickly mount the carrier plate on which the commodity to be printed and a film are fixed onto the mounting frame 6, thereby saving the loading and unloading time of the commodity and facilitating the further improvement of production efficiency.

Further, the mounting frame 6 is connected to the base 1 detachably.

As can be seen from the above description, the mounting frame 6 of a corresponding size may be replaced according to actual application requirements, thereby facilitating the adjustment of a height of the carrier plate.

Further, a rotary motor 12 is further mounted on the base 1, and the extension arm 4 is mounted on an output shaft of the rotary motor 12.

As can be seen from the above description, by driving the extension arm 4 to rotate by the rotary motor 12, the movement accuracy of the heating plate 5 is improved, and manpower is also saved.

With reference to FIG. 1 to FIG. 3, Example 1 of the present application is as follows: a heat press machine includes a base 1, an extension arm 4 and a heating plate 5, wherein the base 1 is provided with a first carrier plate 2 and a second carrier plate 3, the extension arm 4 is rotatably mounted on the base 1, the extension arm is provided with a lifting assembly, and the lifting assembly is connected to the heating plate 5 and used for driving the heating plate 5 to ascend and descend; and it will be understood that by disposing two carrier plates on the base 1 for fixing the commodity to be pressed, and achieving the movement of the heating plate 5 above the two carrier plates by the rotatable extension arm 4, after the commodity on one of the carrier plates is pressed, the heating plate 5 may be moved to be above the other carrier plate to press the commodity in processes of loading, unloading and laminating the commodity by an operator, thereby greatly reducing the idle time of the heating plate 5 and improving the printing efficiency.

Optionally, the extension arm 4 is provided with a rotary handle 41, and the rotary handle 41 facilitates the rotation of the extension arm 4 by the operator, so that the heating plate 5 is quickly moved to be directly above the corresponding carrier plate; further, the rotary handle 41 may be mounted at a top of the extension arm 4, and a mounting position of the rotary handle 41 may be selected according to actual application requirements. In addition, the extension arm 4 may also be driven by the rotary motor 12 to rotate, specifically, the base 1 may be provided with a motor housing 11, the rotary motor 12 is disposed in the motor housing 11, an output shaft of the rotary motor 12 is connected to an extension portion, and by driving the extension arm 4 to rotate by the rotary motor 12, the movement accuracy of the heating plate 5 is improved, and manpower is also saved.

Preferably, a bottom of the first carrier plate 2 and a bottom of the second carrier plate 3 are each provided with a mounting frame 6, the mounting frame 6 is connected to the base 1, and the mounting frame 6 facilitates the mounting of the first carrier plate 2 and the second carrier plate 3, thereby ensuring the stability of the first carrier plate 2 and the second carrier plate 3; specifically, the first carrier plate 2 and the second carrier plate 3 are each connected to the mounting frame 6 detachably, and the mounting frame 6 is disposed to be connected to the carrier plate detachably, so as to facilitate the replacement and maintenance of the carrier plate; more specifically, the mounting frame 6 is connected to the base 1 detachably, and therefore the mounting frame 6 of a corresponding size may be replaced according to actual application requirements, thereby facilitating the adjustment of a height of the carrier plate; and the detachable connection mode includes, but is not limited to, bolted connection, screwed connection, buckle connection, and the like.

Optionally, the bottom of the first carrier plate 2 and the bottom of the second carrier plate 3 are each provided with a clamping projection (not shown in drawings), the clamping protrusion may be inverted T-shaped or L-shaped, a top of the mounting frame 6 is provided with a through hole 61 and a clamping hole 62 communicated with the through hole 61 (as shown in FIG. 3), the through hole 61 is used for the clamping projection to pass through, and when the clamping projection is positioned in the clamping hole 62, the clamping projection abuts against one side of the mounting frame 6 away from the first carrier plate 2 or the second carrier plate 3. The mounting and dismounting of the carrier plate can be quickly achieved by matching the clamping protrusion with the clamping hole 62, and in an actual production process, the operator may quickly unload the printed commodity together with the carrier plate, and quickly mount the carrier plate on which the commodity to be printed and a film are fixed onto the mounting frame 6, thereby saving the loading and unloading time of the commodity and facilitating the further improvement of production efficiency.

In summary, the heat press machine provided in the present application has the feature of high press efficiency, the commodity to be pressed is fixed by disposing two carrier plates on the base, the movement of the heating plate above the two carrier plates is achieved by the rotatable extension arm, and after the commodity on one of the carrier plates is pressed, the heating plate may be moved to be above the other carrier plate to press the commodity in processes of loading, unloading and laminating the commodity by the operator, thereby greatly reducing the idle time of the heating plate and improving the printing efficiency.

The foregoing is merely examples of the present application and is not intended to limit the patent scope of the present application. Any equivalent transformation made by utilizing the contents of the specification and accompanying drawings of the present application, or directly or indirectly applied in the relevant technical field, is similarly included in the scope of patent protection of the present application.

What is claimed is:

1. A heat press machine, comprising a base, an extension arm and a heating plate, wherein the base is provided with a first carrier plate and a second carrier plate, the extension arm is rotatably mounted on the base, the extension arm is provided with a lifting assembly and a rotary handle, and the lifting assembly is connected to the heating plate and used for driving the heating plate to ascend and descend.

2. The heat press machine according to claim 1, wherein the rotary handle is mounted at a top of the extension arm.

3. A heat press machine, comprising a base, an extension arm and a heating plate, wherein the base is provided with a first carrier plate and a second carrier plate, the extension arm is rotatably mounted on the base, the extension arm is provided with a lifting assembly, and the lifting assembly is connected to the heating plate and used for driving the heating plate to ascend and descend, a bottom of the first carrier plate and a bottom of the second carrier plate are each provided with a mounting frame, and the mounting frame is connected to the base.

4. The heat press machine according to claim 3, wherein the first carrier plate and the second carrier plate are each connected to the mounting frame detachably.

5. The heat press machine according to claim 4, wherein the bottom of the first carrier plate and the bottom of the second carrier plate are each provided with a clamping projection, a top of the mounting frame is provided with a through hole and a clamping hole communicated with the through hole, the through hole is used for the clamping projection to pass through, and when the clamping projection is positioned in the clamping hole, the clamping projection abuts against one side of the mounting frame away from the first carrier plate or the second carrier plate.

6. The heat press machine according to claim 3, wherein the mounting frame is connected to the base detachably.

7. The heat press machine according to claim 4, wherein the mounting frame is connected to the base detachably.

8. A heat press machine, comprising a base, an extension arm and a heating plate, wherein the base is provided with a first carrier plate and a second carrier plate, the extension arm is rotatably mounted on the base, the extension arm is provided with a lifting assembly, and the lifting assembly is connected to the heating plate and used for driving the heating plate to ascend and descend, a rotary motor is further mounted on the base, and the extension arm is mounted on an output shaft of the rotary motor.

* * * * *